(12) United States Patent  
Petersen et al.

(10) Patent No.: US 8,583,374 B1  
(45) Date of Patent: *Nov. 12, 2013

(54) SYSTEMS AND METHODS FOR ROUTE SUMMARIZATION

(71) Applicant: Google Inc., Mountain View, CA (US)

(72) Inventors: Morten Just Petersen, Zurich (CH); Noam Ben Haim, Adiswil (CH); Jens Riegelsberger, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,567

(22) Filed: Oct. 2, 2012

Related U.S. Application Data

(63) Continuation of application No. 13/302,562, filed on Nov. 22, 2011, now Pat. No. 8,306,749.

(51) Int. Cl.  
*G01C 17/38* (2006.01)

(52) U.S. Cl.  
USPC ........... 701/533; 701/431; 701/527; 701/541; 340/988

(58) Field of Classification Search  
USPC ......... 701/408, 410, 413, 431, 527, 532, 541; 340/988  
See application file for complete search history.

(56) References Cited

U.S. PATENT DOCUMENTS

| | | | |
|---|---|---|---|
| 7,239,959 B2 | 7/2007 | Rasmussen et al. | |
| 7,996,345 B2 | 8/2011 | Golding et al. | |
| 8,306,749 B1 * | 11/2012 | Petersen et al. | 701/527 |
| 2011/0178697 A1 | 7/2011 | Mincey et al. | |
| 2011/0254915 A1 | 10/2011 | Vincent et al. | |

OTHER PUBLICATIONS

Richter et al., "Simplest Instructions: Finding Easy-to-Describe Routes for Navigation", 2008 Proceedings of the 5th International Conference on Geographic Information Science, pp. 274-289.
Richter et al., "A Model for Context-Specific Route Directions", International Conference Spatial Cognition 2004, pp. 58-78.
Richter, "A Uniform Handling of Different Landmark Types in Route Directions", Spatial Information Theory, 2007, pp. 373-389.
Schulman, "GPS and the End of the Road", The New Atlantis: A Journal of Technology & Society, Spring 2011, pp. 4-32.

* cited by examiner

*Primary Examiner* — Gertrude Arthur Jeanglaude  
(74) *Attorney, Agent, or Firm* — Dority & Manning, P.A.

(57) ABSTRACT

Methods and systems for route summarization are described herein. The method includes generating a route from an origin to a destination, the route including a plurality of maneuvers. One or more maneuvers are removed from the plurality of maneuvers. A summarized route is generated that reflects the removal of the one or more maneuvers from the plurality of maneuvers such that the summarized route has fewer maneuvers than the route.

19 Claims, 6 Drawing Sheets

SYSTEMS AND METHODS FOR ROUTE SUMMARIZATION

FIELD

The present disclosure relates to systems and methods for route summarization.

BACKGROUND

Directions can be described as a sequence of maneuvers to follow a route from an origin to a destination, possibly with the inclusion of additional information such as road names, distances, times, or landmarks. Systems for providing directions can employ algorithms for calculating the sequence of maneuvers according to criteria such as fastest route, shortest route, avoidance of roads, and the like. Certain systems can allow users to store frequently encountered maneuvers to reduce the sequence of maneuvers provided for one or more portions of the route. In addition, directions can be accompanied by a map with the route depicted on the map.

In order to become familiar with a route, a user typically reads through the directions and attempts to memorize some or all of the sequence of maneuvers. Often, users print hardcopies of such directions or utilize turn-by-turn navigation in conjunction with the directions because the completeness of the directions makes memorization difficult.

SUMMARY

Aspects and advantages of the invention will be set forth in part in the following description, or may be obvious from the description, or may be learned through practice of the invention.

A need exists for the ability to summarize a route. A system and method that can also further summarize a route by combining different maneuvers along the route would be particularly useful.

One exemplary implementation of the present disclosure is directed to a method of route summarization. The method includes generating a route from an origin to a destination, the route including a plurality of maneuvers. One or more maneuvers are removed from the plurality of maneuvers. A summarized route is generated that reflects the removal of the one or more maneuvers from the plurality of maneuvers such that the summarized route has fewer maneuvers than the route.

Other exemplary implementations of the present disclosure are directed to systems, apparatus, computer-readable mediums, devices, and user interfaces for summarizing routes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
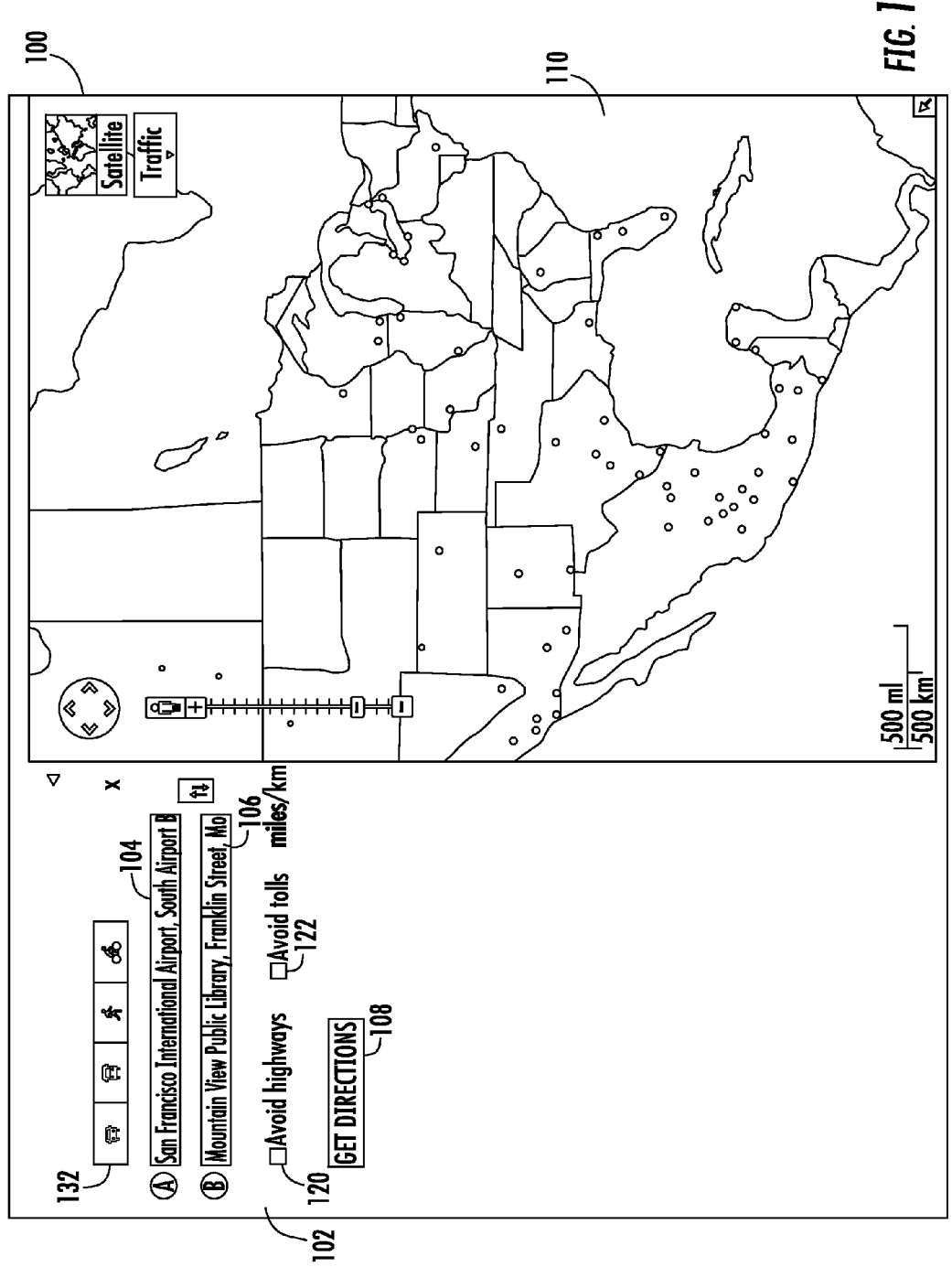
FIGS. 1-4 depict a user interface according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to systems and methods for route summarization for travel, such as by automobile, mass transit, pedestrian, or other modes of travel. Individuals typically have the capability of memorizing between five to nine steps in memory before applying other memorization strategies. However, current routing systems often generate comprehensive route descriptions that are much longer than five to nine steps making them difficult to commit to memory. The total number of steps can be a function of distance covered, but also results from systems over specifying the maneuvers that are required. While some systems can allow users to store frequently encountered maneuvers to reduce the sequence of maneuvers provided for one or more portions of a route, such systems typically require users to input the maneuvers that are to be reduced. These systems also do not account for a typical user's memorization capability.

Accordingly, the present disclosure describes utilization of geographic information about a user to reduce the number of maneuvers in a route. The geographic information about a user can include information such as a home address location for which a user is assumed to have familiarity. Maneuvers of a route can be omitted based on the geographic information about a user thereby allowing a more concise presentation of maneuvers to a user and greatly improving the ability for a user to remember the maneuvers that are presented. Importantly, the present disclosure relates to route summarization on the presentation level. The route to be followed is not modified, but maneuvers are removed in the presentation of the route to the user to make the route more memorable.

In certain aspects of the present disclosure, other strategies can be employed to decrease the number of maneuvers required to follow a route. Multiple maneuvers can be consolidated into a single maneuver based on a variety of different considerations that may not materially impact the user's ability to understand the route. Examples of such considerations include road name changes, reference to vistas or landmarks instead of road names, or the like. Again, such strategies can allow for fewer maneuvers to be presented to a user with the ultimate goal of allowing a user to have greater success in remembering a route.

Referring to FIGS. 1-4, an exemplary user interface in accordance with the present disclosure is illustrated. FIG. 1 illustrates an interface 100 that displays travel direction data entry section 102 and map section 110. As shown, a user has entered San Francisco International Airport, South Airport Boulevard, San Francisco, Calif. in origin field 104 and Mountain View Public Library, Franklin Street, Mountain View, Calif. in destination field 106. The user has the option to modify the route to avoid highways and/or avoid toll roads by selecting the "Avoid highways" box 120 and/or the "Avoid tolls" box 122. The user can request directions by selecting the "Get Directions" button 108.

Figure 2:
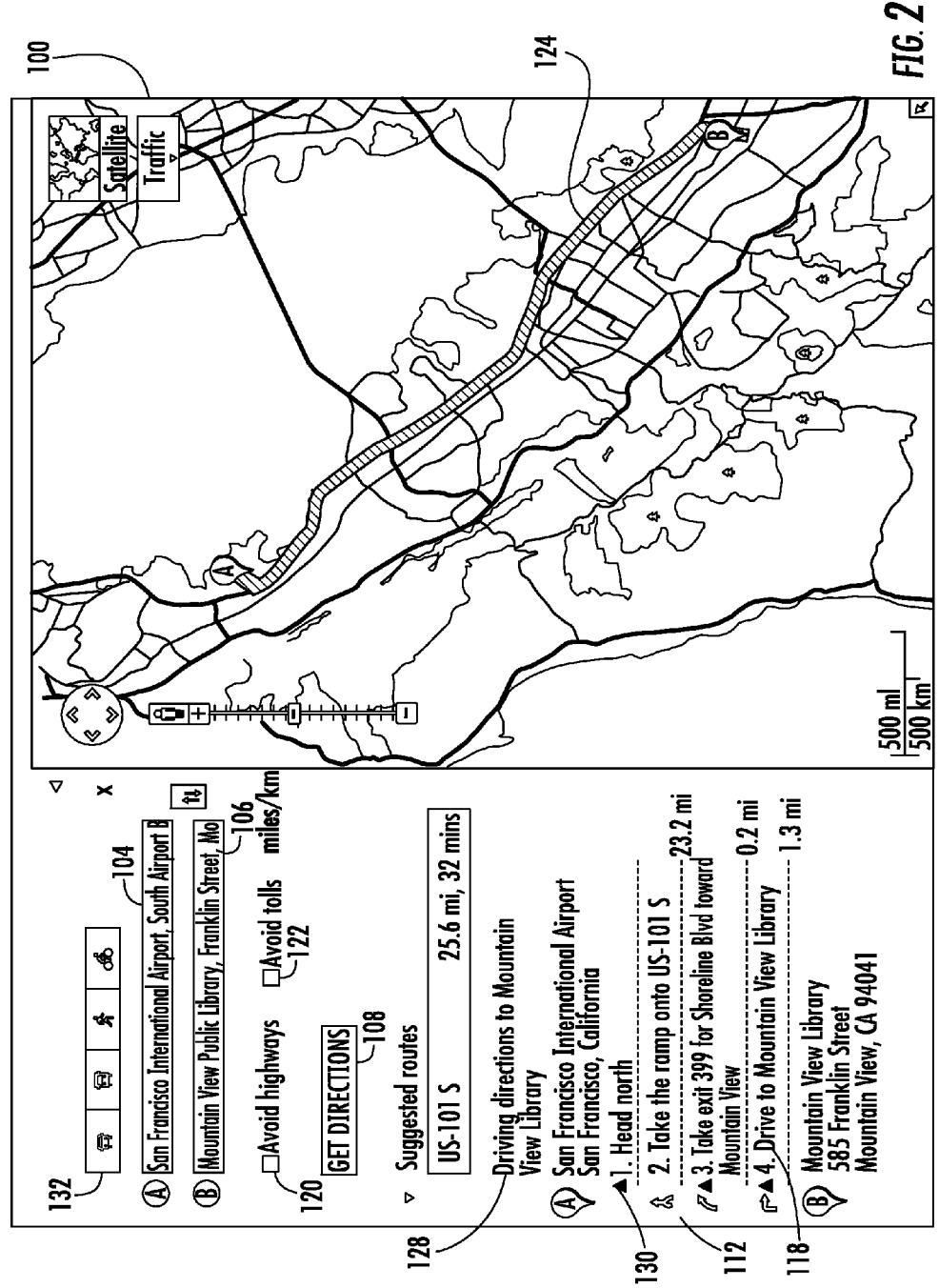

In accordance with the present disclosure, summarized routing can be generated to decrease the number of maneuvers that are presented to a user. Summarized directions 128 are calculated and displayed through interface 100 in travel directions section 112, as illustrated in FIG. 2. The summarized route 128 includes fewer maneuvers 118 than what would traditionally be presented to a user with the removal of maneuvers based, at least in part, on geographic information about the user. Importantly, while the summarized route presented to the user has fewer maneuvers than a comprehensive route, the overall route presented to the user is still identical to such comprehensive route. In this manner, a user is better able to memorize the summarized route 128 being displayed.

With respect to the display of the summarized route 128, in certain aspects of the present disclosure maneuvers that have been omitted based on geographic information and/or consolidating can be viewed by expanding the preceding maneuver to the removed maneuver(s) to show a more comprehensive route 114. For instance, as shown in FIGS. 3 and 4, the arrows 130 can be selected by a user to expand the summarized route.

Figure 3:
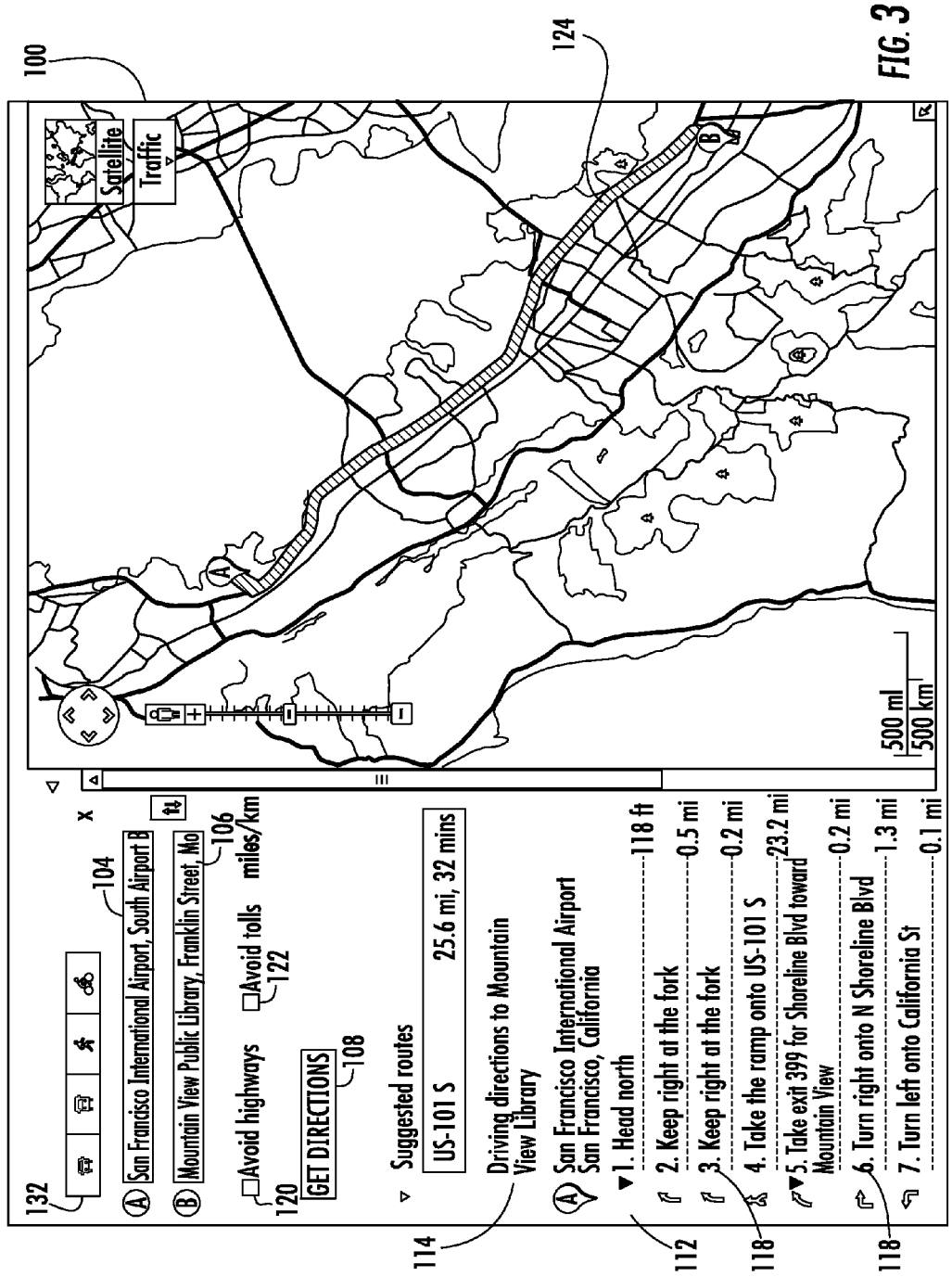
Figure 4:
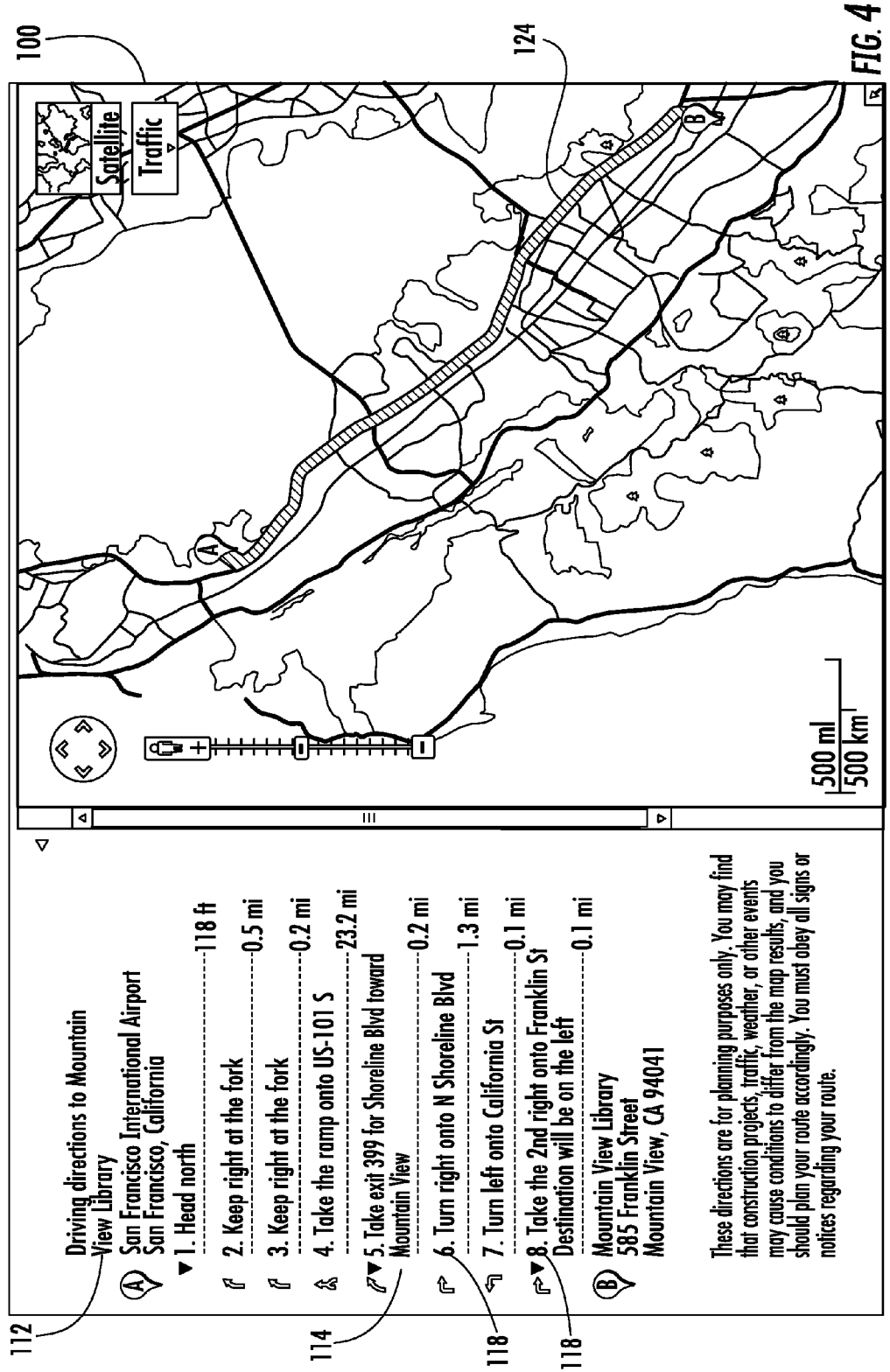

Referring to FIG. 3, the displayed directions or route 114 include a series of numbered steps or maneuvers 118 that can exceed the space provided by travel directions section 112. As such, a scroll bar 116 can be provided so that a user can scroll down to see the remainder of the maneuvers 118 that form route 114. FIG. 4 depicts the remaining maneuvers 118 of route 114 after a user has utilized the scroll bar 116 to scroll down to the bottom of travel directions section 112. In this manner, a user can expand one or more maneuvers of the summarized route for more detail if the user is unfamiliar with one or more portions of the summarized route. In addition, when a summarized route is expanded, the system can learn that a user is unfamiliar with such segment(s) and utilize such information in future directions with overlapping routes.

Map section 110 can include a highlighted portion 124 that identifies the summarized route from origin to destination. Again, because the summarized route is merely a presentation of fewer maneuvers to a user, the highlighted portion 124 is identical to that which would have been presented otherwise. However, if a user chooses to expand a portion of summarized route as described above, map can be updated to show a higher level of detail for the particular part of the summarized route being expanded.

In still other aspects of the present disclosure, the user interface can permit a user to divide the summarized route into segments when the estimated duration of the summarized route exceeds a predetermined length of time. For example, the summarized route can be divided into segments when the estimated duration exceeds about 6 hours, about 8 hours, about 12 hours, or the like, so as to divide the trip into driving days (in aspects where directions are for driving) walking days, or the like. As described above, the route summarization described herein can be utilized for many modes of travel, such as by automobile, mass transit, pedestrian, or other modes of travel and can be optimized for a specific mode of travel by selecting the applicable icon 132 from the user interface.

Figure 5:
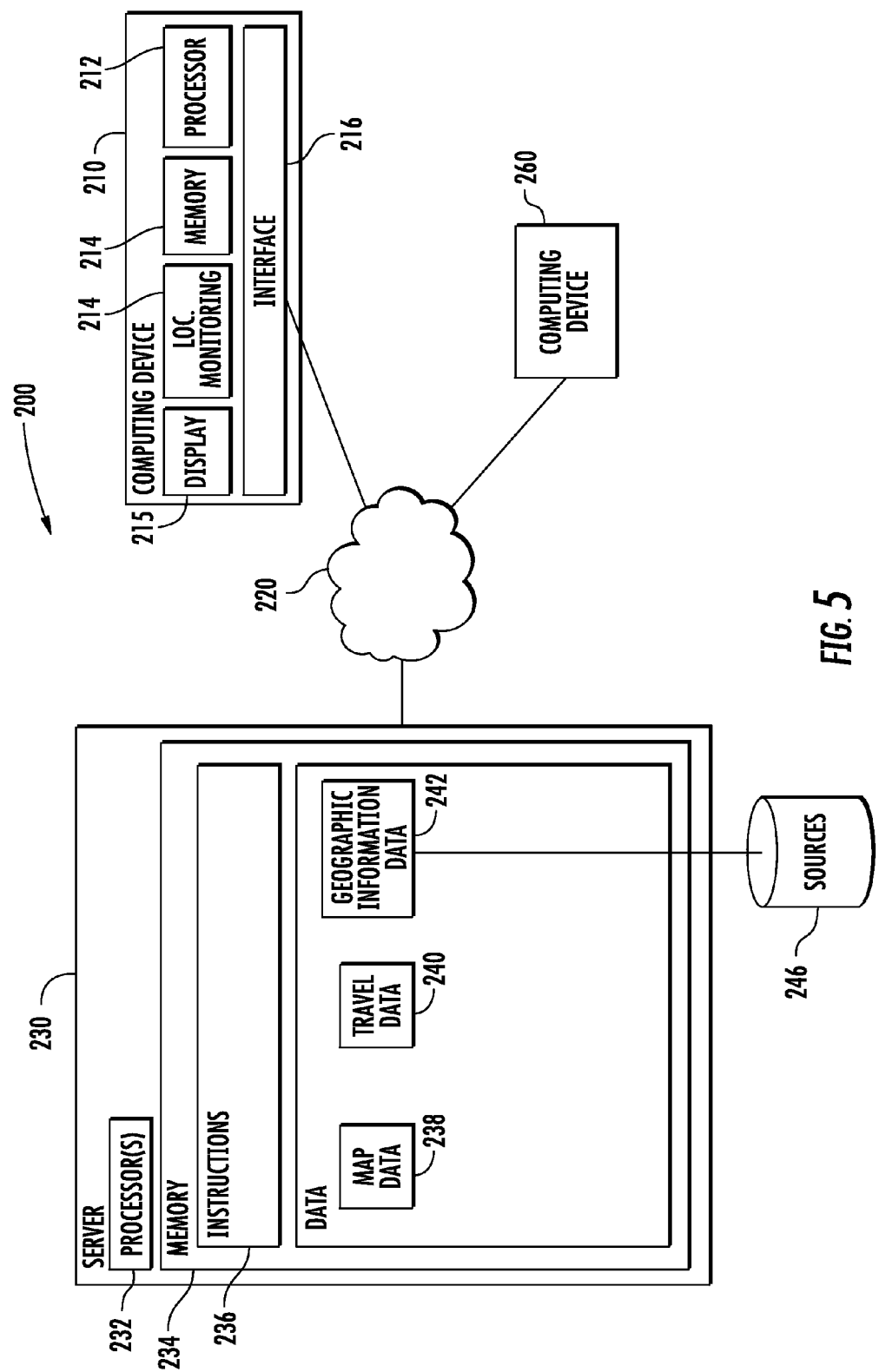
FIG. 5 depicts a block diagram of an exemplary system for route summarization according to an exemplary embodiment of the present disclosure.

FIG. 5 illustrates an exemplary system 200 for generating a summarized route according to an exemplary embodiment of the present disclosure. As illustrated, system 200 includes a computing device 210 for providing summarized route information to a user. The computing device 210 device can take any appropriate form, such as a personal computer, smartphone, desktop, laptop, PDA, tablet, or other computing device. The computing device 210 includes appropriate input and output devices, such as a display screen, touch screen, touch pad, data entry keys, speakers, and/or a microphone suitable for voice recognition. A user can request travel directions by inputting origin and destination information into computing device 210. The computing device 210 can then receive summarized routing information based on the origin and destination information and provide summarized routing information to the user through any suitable output device, such as a display screen 215. In certain aspects of the present disclosure, the computing device 210 can independently calculate routing information based on the origin and destination information and provide the routing information to the user.

The computing device 210 includes a processor(s) 212 and a memory 214. The processor(s) 212 can be any known processing device. Memory 214 can include any suitable computer-readable medium or media, including, but not limited to, RAM, ROM, hard drives, flash drives, or other memory devices. Memory 214 stores information accessible by processor(s) 212, including instructions that can be executed by processor(s) 212. The instructions can be any set of instructions that when executed by the processor(s) 212, cause the processor(s) 212 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 214 can also include data that may be retrieved, manipulated, or stored by processor(s) 214. For instance, memory 214 can store information associated with the user of the computing device, such as geographic information associated with the user. As will be discussed in further detail below, such information can be used in the summarization of a route to for a specific individual.

The computing device 210 can include a network interface 216 for accessing information over a network 220. The network 220 can include a combination of networks, such as cellular network, Wi-Fi network, LAN, WAN, the Internet, and/or other suitable network and can include any number of wired or wireless communication links. For instance, computing device 210 could communicate through a cellular network using a WAP standard or other appropriate communication protocol. The cellular network could in turn communicate with the Internet, either directly or through another network.

Computing device 210 can also have a location monitoring component 218 for generating location information for the computing device 210. For instance, the computing device 210 can include a GPS module or can include a component for determining the position of the computing device 210 based on signals received from one or more cell phone towers. The computing device 210 can communicate location information over network 220 or utilize such information independently for use in providing routing information to the user.

Computing device 210 can communicate with another computing device 230 over network 220. Computing device 230 can be a server, such as a web server, that provides information to a plurality of client computing devices, such as computing devices 210 and 260 over network 220. Computing device 230 receives requests from computing device 230 and locates information to return to computing devices 210 responsive to the request. The computing device 230 can take any applicable form, and can, for instance, include a system that provides search services, such as the services provided by Google Inc. However, in certain aspects of the present disclosure, computing device 210 can also compute routing information independently from computing device 230.

Similar to computing device 210, computing device 230 includes a processor(s) 232 and a memory 234. Memory 234 can include instructions 236 for receiving routing request information from a client device and for generating a route for presentation to the client device based on the routing request information. Memory 234 can also include or be coupled to various databases containing information for presentation to a user and for generating route information. For instance, memory 234 can include a map database 238, travel parameter database 240, and a geographic information database 242. As will be discussed below, processor(s) 232 can be configured to execute instructions stored in memory 234 to provide summarized route information to a user based at least in part on information stored in map database 238, travel parameter database 240, and/or geographic information database 242. In certain aspects of the present disclosure, memory 214 of computing device 210 can also be associated with one or more of the above described databases independent of computing device 230.

Map database 238 stores map-related information, at least a portion of which can be transmitted to or present in a client device, such as computing device 210. For instance, map database 238 can store map tiles, where each tile is an image of a particular geographic area. Depending on the resolution (e.g. whether the map is zoomed in or out), a single tile may cover an entire state in relatively little detail or just a few streets in high detail.

The map database 238 can also include points of interest. A point of interest can be any item that is interesting to one or more users and that is associated with a geographical location. For instance, a point of interest can include a landmark, stadium, or building. A point of interest can be added to the map database 238 by professional map providers, individual users, or other entities.

The map database 238 can also store street information. In addition to street images in the tiles, the street information can include the location of a street relative to a geographic area or other streets. For instance, map database 238 can store information indicating whether a traveler can access one street directly from another street. Street information can further include street names where available, and potentially other information, such as distance between intersections and speed limits. All or some of the foregoing can be used by processor(s) 232 and/or processor(s) 212 to compute a route between an origin and destination.

The travel parameter database 240 stores various travel parameters that can be used in the determination of a route from one location to another. For instance, travel parameter database 240 can include information associated with estimated trip time while traversing a particular street or path between locations. Travel parameter database 240 can include information associated with average speed over a particular street or traversable path. Travel parameter database 240 can further include traffic information that can be used in the computation of a route. For instance, travel parameter database 240 can include real-time traffic conditions obtained from, for instance, a traffic service. The travel parameter database 240 can include information obtained from public agencies, roadway monitors, traffic cameras, and the like. The information can include real-time information concerning the speed of traffic flow at particular points in a transportation system.

Geographic information database 242 can include information optionally provided by a particular user of the route summarization system 200. For instance, a user of computing device 110 can indicate that the user wishes to share information with computing device 130, such as home address information, work address information, historical routes taken by the user, a location for which a user has previously indicated familiarity, or other information. The geographic information database can mine such information from a variety of sources 246 such as web browsing history, search history, maps history, address books, social networks, blog archives, e-mail archives, calendar entries or the like. Other information, such as credit card transaction information, can be utilized as well.

The information stored in each of these sources 246 can be associated with specific programs or types of applications, or with the user's overall operation of the computing device on which the information is present. For instance, the web browsing history and search history can be associated with one or more web browsers such as the Google Chrome web browser developed by Google Inc. The maps history can also be associated with the web browsers or other applications such as Google Earth or Google Maps developed by Google Inc. The address book and e-mail archive information can be associated with the user's messaging application, such as Google's Gmail. The social networking site information can be associated with one or more social networking sites for which the user is affiliated, such as Google+ developed by Google Inc. The blog archives can be associated with the user's blog application, such as Google's Blogger. The calendar entries database can similarly be linked to the messaging application or other applications such as Google Calendar. While a number of different databases have been identified above, other databases which can contain geographic information can also be employed, such as the database associated with Google Latitude, a tool which lets users share their current location with friends.

In certain implementations, geographic information can be mined/extracted from the databases/sources 246 on a regular basis or in response to a request. Initially, a user can sign up for geographic information to be accessed to assist in route summarization. This may include the user providing authorization to use one or more of the databases in memory 214 and memory 234. According to one example, the user may select specific databases 246 to which the system of the present disclosure is granted access. For instance, the user may grant access to an address book but not to the e-mail archives. It should be understood that information about a user is utilized only if permission is granted after the user has been notified of what information is to be accessed and how it is to be utilized.

The geographic information can be gleaned from any of the above-described sources 246 in a number of suitable ways. For instance, home address information and/or work address information can shared by a user with different programs as part of a user profile. A user's historical routes can be saved by a mapping program or can be logged by the computing device 210 and/or computing device 230. Locations for which a user has previously indicated familiarity can be mined from user recommendations and/or frequency of reference in a user's various accounts. For locations for which a user has indicated familiarity to be deemed reliable, the system can also require additional verification, such as repeated reference to such locations in more than one of the geographic information database's sources. The preceding examples are merely exemplary, however, and it should be appreciated that one of ordinary skill in the art could locate the required information a variety of different ways in accordance with the present disclosure.

Geographic information database 242 can be used by processor(s) 232 and/or processor(s) 212 in generating a summarized route as will be described in more detail herein. Geographic information database 242 can at least temporarily store geographic information for use by processor(s) 232 and/or processor(s) 212 in determining a route.

Within computing device 230, processor(s) 232 can compute a summarized route in response to requests from a user device, such as computing device 210. Alternatively, computing device 210 can compute a summarized route independently of computing device 230.

Once a route and summarized route have been determined, computing device 130 can provide such route information to computing device 110 over network, in embodiments where computing device 130 calculates such routes. The route information can be provided to computing device 110 in any suitable format. For mobile devices, the information can be transmitted as an HTML document or other fully-formatted document that will not require significant processing by the mobile device. The information can include HTML code, XML messages, WAP code, Java applets, xhtml, plain text, voiceXML, VoxML, VXML, or other suitable format, that causes the device to display the suggested route information.

The route information can include information in addition to maps with routes rendered on them or the maneuvers associated with the summarized route. For instance, locations on the map could be provided with hyper-linked icons whose selection will cause information to be broadcast to the user. Other information could include annotations associated with points of interest along the travel route. The annotations displayed to the user could be selected based on personal preferences optionally shared by the user with the system.

Figure 6:
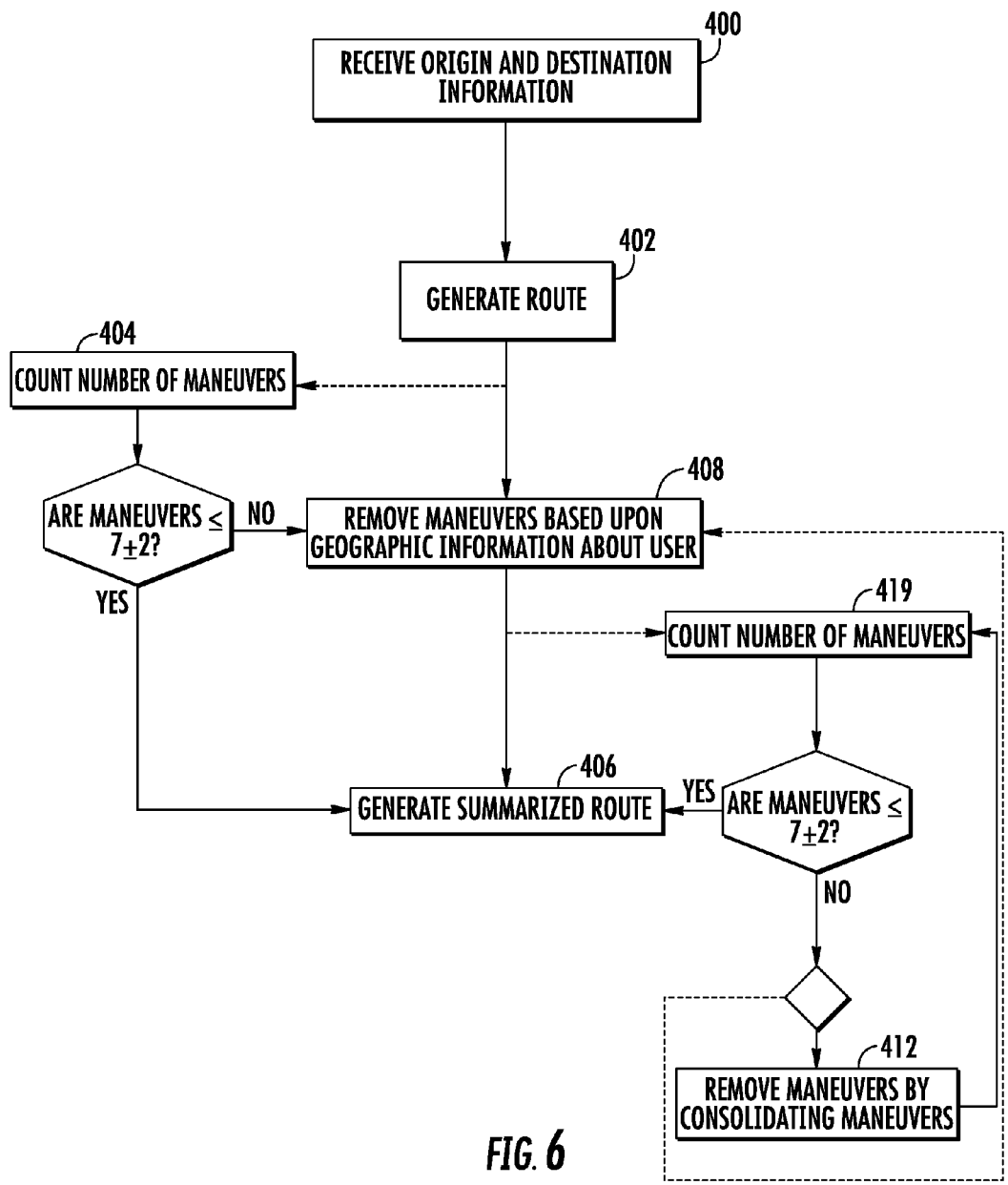
FIG. 6 depicts a flow diagram of an exemplary method according to an exemplary embodiment of the present disclosure.

FIG. 6 is an exemplary flow diagram of a method for generating a summarized route. The method shown in FIG. 6 will be discussed with reference to the route summarization system 200 illustrated in FIG. 5. However, those of ordinary skill in the art, using the disclosures provided herein, will appreciate the methods discussed herein can be executed by any computing device or combination of computing devices.

Referring back to FIG. 6, origin and destination information for a particular travel objective are received (400). The origin information can be manually entered by a user on computing device 210 or can be based on a user's current location determined by, for instance, the location monitoring component 218. The destination information can be manually entered by the user or can be automatically retrieved based on the information associated with the user, such as the user's calendar information. For instance, the destination information can be based on an intended location for a meeting scheduled in a user's calendar.

After the origin and destination information are received, a route is generated from the origin to the destination (402) in a manner as would be understood by one of ordinary skill in the art. The route includes a sequence of maneuvers to follow the route from the origin to the destination. The route can be generated by using information from the map database 238 and travel parameter database 240 and the system of the present disclosure can calculate the sequence of maneuvers according to conventional criteria such as fastest route, shortest route, avoidance of roads, and the like, as would be understood by one of ordinary skill in the art.

Once the route has been generated, the number of maneuvers or steps to follow the route from the origin to the destination can be optionally counted (404). In this regard, as discussed herein, individuals have the capability of memorizing between five to nine steps in memory before applying other memorization strategies. If the number of maneuvers that make up the route are less than or equal to 7±2, then the system can generate a summarized route (406), which in this instance is identical to the route, and display the summarized route to the user. If the number of maneuvers is greater than 7±2, then the system can remove one or more maneuvers based upon geographic information about the user (408).

In other aspects of the present disclosure, if the number of maneuvers that make up the route are less than or equal to 7, then the system can generate a summarized route (406) and display the route to the user. If the number of maneuvers is greater than 7, then the system can remove one or more maneuvers based upon geographic information about the user (408).

In still other aspects of the present disclosure, if the number of maneuvers that make up the route are less than or equal to 5, then the system can generate a summarized route (406) and display the route to the user. If the number of maneuvers is greater than 5, then the system can remove maneuvers based upon geographic information about the user (408).

In certain aspects of the present disclosure, the system can generate a summarized route (406) and display the route to the user if the number of maneuvers that make up the route are reduced by a certain percentage when compared to the number of maneuvers of route (402), such as 10% fewer maneuvers, 20% fewer maneuvers, 30% fewer maneuvers, or the like. In yet other aspects of the present disclosure, the system can remove one or more maneuvers based upon geographic information about the user (408) without counting the number of maneuvers (404). In accordance with the present disclosure, the user can be provided with a concise set of maneuvers and have a better chance of memorizing the maneuvers to complete the route.

The geographic information about the user can include information from the geographic information database 242 optionally provided by a particular user of the route summarization system 200, such as home address information, work address information, historical routes taken by the user, a location for which a user has previously indicated familiarity, or other information. The system can remove maneuvers from the route generated (402) based on such information.

In this regard, the system of the present disclosure can infer that a user has familiarity with and can locate major roadways, such as interstate roadways or major arterial roadways, within a certain radius of the user's home address or work address. In certain aspects of the present disclosure, the system can infer that a user can locate major roadways within about a 5 mile radius of a home address or work address. In some aspects of the present disclosure, the system can infer that a user can locate major roadways within about a 1 mile radius of a home address or work address. If the route's maneuvers include maneuvers between a major roadway and the user's home and/or work address(es) within a predefined radius, one or more of such maneuvers can be removed from the route. In this manner, the system can overlay a radius of the user's home and/or work address(es) onto the generated route to determine which maneuvers can be removed.

For example, referring again to FIGS. 1-4, the system of the present disclosure can utilize geographic information about the user to summarize the route. In the example presented, it can be assumed that the user works at Mountain View Public Library at Franklin Street, Mountain View, Calif. and the system infers that the user is familiar with major roadways within a 5 mile radius of the user's work address. Thus, the system can remove maneuvers between Mountain View Public Library and the closest major roadway since it is inferred that a user will have familiarity with such maneuvers. When comparing the maneuvers 118 shown in FIG. 2 to the expanded maneuvers 118 shown in FIGS. 3 and 4, it can be seen that the maneuvers after US-101, and specifically after exit 399 for Shoreline Blvd from US-101, are omitted in the summarized route 128 shown in FIG. 2. In addition, the final detailed maneuver for "Take 2nd right onto Franklin Street Destination will be on the left" can be replaced by a generic maneuver such as "Drive to Mountain View Public Library", which can be inserted after the last maneuver involving the major roadway, such as the exit maneuver from the major roadway. Alternatively, if the address provided from the geographic information is the origin rather than the destination, a generic maneuver such as "Drive to (Insert name of major roadway)" can be provided as the first maneuver.

In the previous example, geographic information about the user enabled the removal of 4 maneuvers from the route for a summarized route having total of 4 maneuvers. However, as discussed above, in certain aspects of the present disclosure, the system can count the number of maneuvers and determine whether or not to utilize geographic information to remove maneuvers.

Indeed, if the number of maneuvers required to be removed to achieve the predetermined count of maneuvers to trigger generation of a summarized route is less than the number of maneuvers that are capable of being removed based upon geographic information about the user, then the system can remove less than all of the maneuvers capable of being removed, such as only the number of maneuvers required to be removed. Using the previous example from FIGS. 1-4 as an illustration, if the predetermined count of maneuvers to trigger generation of a summarized route was less than or equal to 5 maneuvers, then although the geographic information about the user enabled the removal of 4 maneuvers, the system could have only removed 3 maneuvers to leave a total of 5 maneuvers in the route.

Similarly, historical routes taken by a user can allow the system of the present disclosure to infer familiarity with the maneuvers encompassed by such historical routes. In certain aspects of the present disclosure, the system can infer familiarity with the maneuvers encompassed by a historical route traveled by the user if the user has traveled the route greater than 5 times. In some aspects of the present disclosure, the system can infer familiarity with the maneuvers encompassed by a historical route traveled by the user if the user has traveled the route greater than 10 times. If the route's maneuvers include maneuvers that are encompassed by historical routes taken by a user, one or more of such maneuvers can be removed from the route.

If a user indicates familiarity with a certain location, for example by repeatedly citing a location or by repeatedly visiting a location, the system can infer that a user has familiarity with and can locate major roadways, such as interstate roadways, within a certain radius of such location, although the radius might not be as large as that discussed above in reference to the user's home address or work address. In certain aspects of the present disclosure, the system can infer that a user can locate major roadways within about a 1 mile radius of a familiar location. In some aspects of the present disclosure, the system can infer that a user can locate major roadways within about a 0.5 mile radius of a familiar location.

In this manner, the system can overlay a radius of the user's familiar location address(es) onto the generated route to determine which maneuvers can be removed. If the route's maneuvers include maneuvers between a major roadway and familiar location address(es) within a predefined radius, one or more of such maneuvers can be removed from the route. Alternatively, or in addition to such removal of maneuvers based on familiarity with a certain location, the system can also utilize familiar locations as landmarks that are identified in the reduced maneuvers of the route. In addition, as described previously, if a summarized route has been expanded by a user, the system can learn that a user is unfamiliar with such segment(s) and utilize such information in future directions with overlapping routes. For instance, referring to FIGS. 3 and 4, all of the arrows 130 have been selected by a user to expand the summarized route in total, indicating unfamiliarity with all of the segments of the route. In subsequent routing, the system can utilize such information to produce an expanded route for a predetermined number of times before familiarity is once again assumed by the system.

Referring again to FIG. 6, once the one or more maneuvers have been removed based on geographic information about the user (408), the number of maneuvers or steps to follow the route from the origin to the destination can optionally be counted again (410). If the number of maneuvers that make up the route are less than or equal to 7±2, (or any other predetermined number of maneuvers, such as less than or equal to 7 or less than or equal to 5 or less than a predetermined percentage of the original number of maneuvers) then the system can generate a summarized route (406). If the number of maneuvers is greater than 7±2 (or any other predetermined number of maneuvers, greater than or equal to 7 or greater than or equal to 5), then the system can either again remove one or more maneuvers based upon geographic information about the user (408) or, optionally, remove maneuvers by consolidating maneuvers (412).

The optional step of consolidating maneuvers (412) can further reduce the number of maneuvers in a route in addition to utilizing geographic information about the user to reduce maneuvers. Often, it is possible to combine actions for two or more maneuvers into one maneuver. For instance, when two or more maneuvers relate to continuing on a road for which the road name changes or continuing on the same road, such maneuvers can be consolidated with minimal impact on the user. For example, when a secondary road joining a main road makes up two or more maneuvers or a exiting a highway onto an exit ramp requires multiple maneuvers, such maneuvers can be consolidated into one maneuver. Maneuvers identifying access points to major destinations (e.g., "Turn left to enter shopping mall") can also be consolidated into other maneuvers as it is assumed that a user will see the major destination and will not need a maneuver to point out to the access point to such destination. Similarly, maneuvers that have a common landmark in connection can be consolidated (e.g., "Follow the road keeping the lake immediately on your left"). In this manner, consolidation of maneuvers can further reduce the set of maneuvers displayed to a user and give the user a better chance of memorizing the maneuvers to complete the route.

With reference again to FIGS. 1-4, the system consolidates the first three steps of route 114 such that summarized route 128 does not does not include the two "Keep right at the fork" maneuvers that continue along the same roadway. In this manner, maneuvers can be removed/consolidated in addition to those removed based on geographic information.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of route summarization, the method executed by a computer system and comprising:
    generating a route from an origin to a destination, the route comprising a plurality of maneuvers;
    consolidating two or more maneuvers into a single maneuver;
    generating a summarized route, wherein the summarized route reflects the consolidating of two or more maneuvers from the plurality of maneuvers such that the summarized route comprises fewer maneuvers than the route.

2. The method of claim 1, wherein the two or more maneuvers consolidated into a single maneuver represent a road name change.

3. The method of claim 1, wherein the two or more maneuvers consolidated into a single maneuver represent a secondary road connecting a main road.

4. The method of claim 1, wherein the two or more maneuvers consolidated into a single maneuver represent an access point to a destination.

5. The method of claim 1, wherein the two or more maneuvers consolidated into a single maneuver represent a highway exit ramp.

6. The method of claim 1, wherein the two or more maneuvers consolidated into a single maneuver represent common maneuvers having a common landmark adjacent thereto.

7. The method of claim 1, wherein the two or more maneuvers consolidated into a single maneuver represent continuing on the identical road.

8. The method of claim 1, wherein the summarized route comprises at least 5 maneuvers but no greater than 9 maneuvers.

9. The method of claim 1, wherein the summarized route comprises 7 maneuvers.

10. A system comprising a processing device and a network interface, the processing device configured to:
    receive a request identifying a user, an origin, and a destination;
    identify a list of maneuvers, the list of maneuvers comprising instructions defining a route from the origin to the destination;
    generate a summarized route from the list of maneuver, the summarized route having at least one maneuver from the list of maneuvers but fewer than all of the maneuvers from the list of maneuvers, the summarized route generated by consolidating of two or more maneuvers from the list of maneuvers; and
    provide, via the network interface, the summarized route to another processing device.

11. The system of claim 10, wherein the processing device is further configured to provide, via the network interface, the list of maneuvers omitted from the summarized route to the processing device provided with the summarized route.

12. The system of claim 10, wherein the processing device provided with the list of maneuvers omitted from the summarized route comprises a display having a user interface in which the summarized route can be expanded to include one or more maneuvers from the list of maneuvers omitted from the summarized route.

13. The system of claim 10, wherein the user interface comprises a map that depicts the summarized route.

14. The system of claim 13, wherein when the summarized route is expanded to include one or more maneuvers from the list of maneuvers omitted from the summarized route the map is updated to depict the expanded summarized route.

15. A computer-readable medium having computer-readable instruction for execution by a processor, causing the processor to perform the operations of:
    receiving a request identifying a user, an origin, and a destination;
    identifying a list of maneuvers, the list of maneuvers comprising instructions defining a route from the origin to the destination; and
    generating a summarized route from the list of maneuvers, the summarized route having at least one maneuver from the list of maneuvers but fewer than all of the maneuvers from the list of maneuvers, the summarized route generated by consolidating of two or more maneuvers from the list of maneuvers.

16. The computer-readable medium of claim 15, further comprising presenting a user interface on a display device, the user interface comprising the summarized route.

17. The computer-readable medium of claim 16, wherein the user interface allows for the summarized route to be expanded to include one or more maneuvers from the list of maneuvers omitted from the summarized route.

18. The computer-readable medium of claim 16, wherein the user interface comprises a map that depicts the summarized route.

19. The computer-readable medium of claim 16, wherein when the summarized route is expanded to include one or more maneuvers from the list of maneuvers omitted from the summarized route a map is updated to depict the expanded summarized route.

* * * * *